(12) United States Patent
Kagaya et al.

(10) Patent No.: US 8,836,845 B2
(45) Date of Patent: Sep. 16, 2014

(54) IMAGING DEVICE AND PORTABLE TERMINAL

(75) Inventors: Hiroaki Kagaya, Hino (JP); Toshiki Ohinata, Sagamihara (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/634,846

(22) PCT Filed: Feb. 23, 2011

(86) PCT No.: PCT/JP2011/053948
§ 371 (c)(1),
(2), (4) Date: Sep. 13, 2012

(87) PCT Pub. No.: WO2011/114847
PCT Pub. Date: Sep. 22, 2011

(65) Prior Publication Data
US 2013/0010176 A1    Jan. 10, 2013

(30) Foreign Application Priority Data
Mar. 16, 2010    (JP) ................................. 2010-059084

(51) Int. Cl.
*H04N 5/225*    (2006.01)
*G03B 11/00*    (2006.01)

(52) U.S. Cl.
CPC .............. *G03B 11/00* (2013.01); *H04N 5/2254* (2013.01); *H04N 5/2253* (2013.01)
USPC ..................................... 348/340; 348/207.99

(58) Field of Classification Search
CPC ........................... H04N 5/2259; H04N 5/2253
USPC .............................. 348/207.99, 373–375, 340
See application file for complete search history.

(56) References Cited

U.S. PATENT DOCUMENTS 7,515,202 B2 *    4/2009    Saito et al. .................... 348/374

FOREIGN PATENT DOCUMENTS

| JP | 9-35312 | 2/1997 |
|---|---|---|
| JP | 2001-245186 | 9/2001 |
| JP | 2004-334048 | 11/2004 |
| JP | 2005-236830 | 9/2005 |
| JP | 2007-67978 | 3/2007 |
| JP | 2009-3058 | 1/2009 |
| JP | 2009-164724 | 7/2009 |
| JP | 2009-218918 | 9/2009 |
| JP | 2009-222740 | 10/2009 |
| JP | 2009-295742 | 12/2009 |

\* cited by examiner

*Primary Examiner* — Tuan Ho
(74) *Attorney, Agent, or Firm* — Cozen O'Connor

(57) ABSTRACT

An imaging device having an optical imaging system which has a parallel plate which is transparent at least in a visible light region, is joined by adhesives and is held on a holding member, wherein the holding member including: an opening section which is provided in order to pass light rays from the optical imaging system; a holding surface for holding a periphery of the parallel plate, formed around the opening section in a square shape, and intersecting perpendicularly to an optical axis of the optical imaging system; a side wall which is provided to stand parallel to the optical axis at an outside with respect to the opening section of the holding surface; and an adhesive collecting section which is arranged in each of four corners of the holding surface and is hollowed from the holding surface.

10 Claims, 4 Drawing Sheets

Prior Art

IMAGING DEVICE AND PORTABLE TERMINAL

RELATED APPLICATIONS

This is a U.S. National Phase Application under 35 USC 371 of International Application PCT/JP2011/053948 filed on Feb. 23, 2011.

This application claims the priority of Japanese Application No. 2010-059084 filed Mar. 16, 2010, the content of which is hereby incorporated by reference.

TECHNICAL FIELD

The present invention relates to the imaging device which is provided with an optical imaging system having a parallel plate and a portable terminal which is provided with the imaging device.

BACKGROUND

Commonly, a small thin imaging device comes to be carried in a portable terminal which is a small thin electronic device such as a mobile phone and a PDA (Personal Digital Assistant) etc., and as a result, it is possible to transmit not only voice information but picture information to a remote place mutually.

A solid-state image pickup element which executes photoelectric conversion of a photographic subject image imaged with an image pickup lens is used for the imaging device. A CCD (Charge Coupled Device) type image sensor, a CMOS (Complementary Metal-Oxide Semiconductor) type image sensor, etc. are used as a solid-state image pickup element.

Moreover, an infrared cut off filter which cuts off infrared light is arranged between the image pickup lens and the solid-state image pickup element in the imaging device.

As such imaging device, an imaging device that the circumference of the opening which provided for passage of light rays from image pickup lens is provided with a quadrangle attachment part, adhesives are applied to four adhesive areas formed as hollows in each center of four sides of the adhesive joint formed, and the infrared cut off filter of the quadrangle joined to an adhesive joint is known (refer to patent document 1).

PRIOR ART DOCUMENTS

Patent Documents

Patent Document 1: Unexamined Japanese Patent Application Publication No, 2009-164724

BRIEF DESCRIPTION OF THE INVENTION

Problems to be Solved by the Invention

With the imaging device indicated in the patent documents 1, since the adhesive flows into adhesive joints when an infrared cut off filter is placed on an attachment part and adhesive are dropped from the outside of infrared cut off filter into four adhesive joints, the infrared cut off filter is joined. At this time, the dropped adhesive flow along the edge of an infrared cut off filter and gap of the wall which is vertically arranged around the infrared cut off filter attachment part by the same action as capillarity, and the adhesive which flowed from two sides of an infrared cut off filter gather for an included angle. When there is much quantity of the dropped adhesives, the quantity of the adhesives gathering into four corners also increases, but since there is a wall which is vertically arranged around the attachment part, the adhesive cannot flow to outside. For this reason, adhesives flow through the gap of the infrared cut off filter and the attachment part, and flow in into an inside opening. As a result, adhesives drop down to the solid-state image pickup element, and there is a risk of defect of an image occurring.

In view of the problems described above, it is an object of the present invention to provide an imaging device constituted so that adhesives might not flow into an inside opening, and a portable terminal provided with the imaging device, when joining parallel plates such as an infrared cut off filter with adhesives.

Means to Solve the Problems

The above-mentioned purpose is achieved by invention indicated below.

1. An imaging device having an optical imaging system which has a parallel plate which is transparent at least in a visible light region, is joined by adhesives and is held on a holding member, wherein the holding member including an opening section which is provided in order to pass light rays from the optical imaging system; a holding surface for holding a periphery of the parallel plate, formed around the opening section in a square shape, and intersecting perpendicularly to an optical axis of the optical imaging system; a side wall which is provided to stand parallel to the optical axis at an outside with respect to the opening section of the holding surface; and an adhesive collecting section which is arranged in each of four corners of the holding surface and is hollowed from the holding surface.

02. In the abovementioned imaging device of item 1, further includes a solid-state image pickup element performing a photoelectric conversion of an image of a photographic subject imaged with an image pickup lens; wherein the parallel plate is arranged between the image pickup lens and the solid-state image pickup element 3. In the abovementioned imaging device of items 1 or 2, wherein the parallel plate is an infrared cut off filter.

4. In the abovementioned imaging device of any one of items 1 to 3, wherein the parallel plate is formed in an approximate quadrangle.

5. In the abovementioned imaging device of any one of items 1 to 4, wherein the holding member includes an adhesive dropping surface wider than other portions in approximately each center of four sides of the holding surface.

6. In the abovementioned imaging device of any one of items 1 to 5 further includes a wall surface reaching from holding surface to adhesive collecting sections is formed as a slanted surface.

7. In the abovementioned imaging device of any one of items 1 to 6, wherein a surface around the opening section is formed to be hollowed from the holding surface, and a step of the holding surface and a bottom surface of the adhesive collecting section is formed to be smaller than a step of the holding surface and the surface around the opening section.

8. In the abovementioned imaging device of item 7 further includes a protrusion part arranged in a protruding manner in a square shape at the surface around the opening section.

9. The portable terminal includes the abovementioned imaging device of any one of items 1 to 8.

Effects of the Invention

According to the imaging device or the portable terminal with the imaging device, even if the dropped adhesive flow along the edge of an infrared cut off filter by the same action as capillarity and gather into four corners, when joining parallel plates such as an infrared cut off filter with adhesives, adhesives do not flow into the inside opening and drop down to the solid-state image pickup element

PREFERRED EMBODIMENTS OF THE INVENTION

Figure 1A:
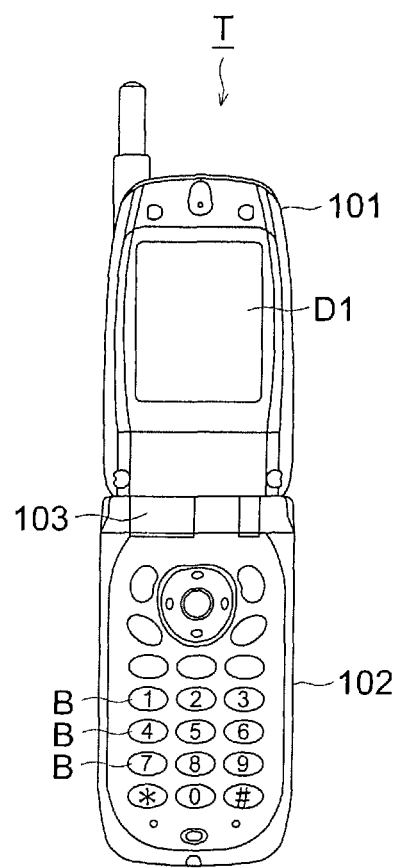
FIG. 1 is an outline view of a mobile phone.
Figure 1B:
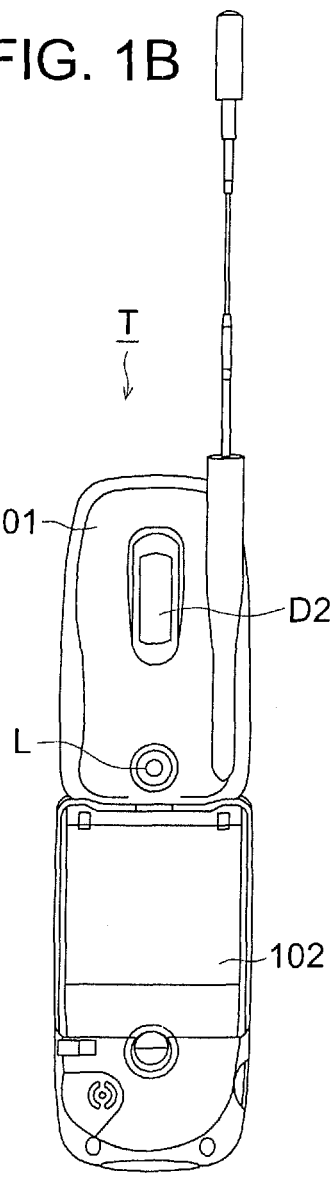

First, the mobile phone as an example of a portable terminal is explained based on FIG. 1 as the outline view. In addition, FIG. 1 (A) is a figure which shows the inside of the opened foldaway mobile phone, and FIG. 1 (B) is a figure which shows the outside of the opened foldaway mobile phone.

In FIG. 1, as for the mobile phone T, an upper case 101 as a case equipped with display screen D1 and D2, and a lower case 102 equipped with manual operation button B are connected by hinge 103. The imaging device is built in under the display screen D2 in the upper case 101, and the image pickup lens L has exposed to the outer surface of the upper case 101.

The position of this imaging device is good to be arranged at the upper part or side part of the display screen D2 in the upper case 101. Moreover, the mobile phone T is not limited to foldaway.

Figure 2:
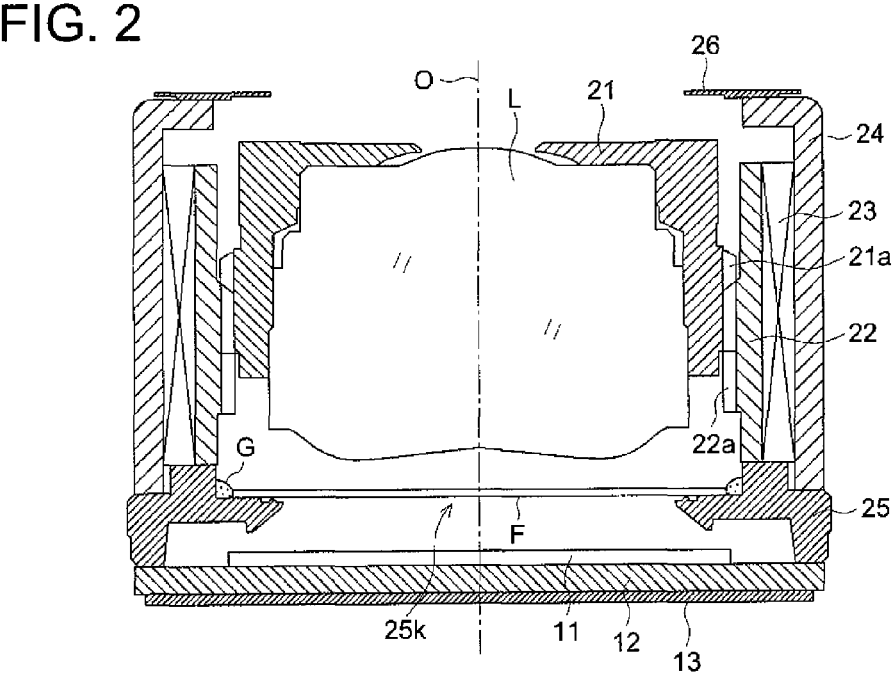
FIG. 2 is a longitudinal section of an imaging device.
Figure 3:
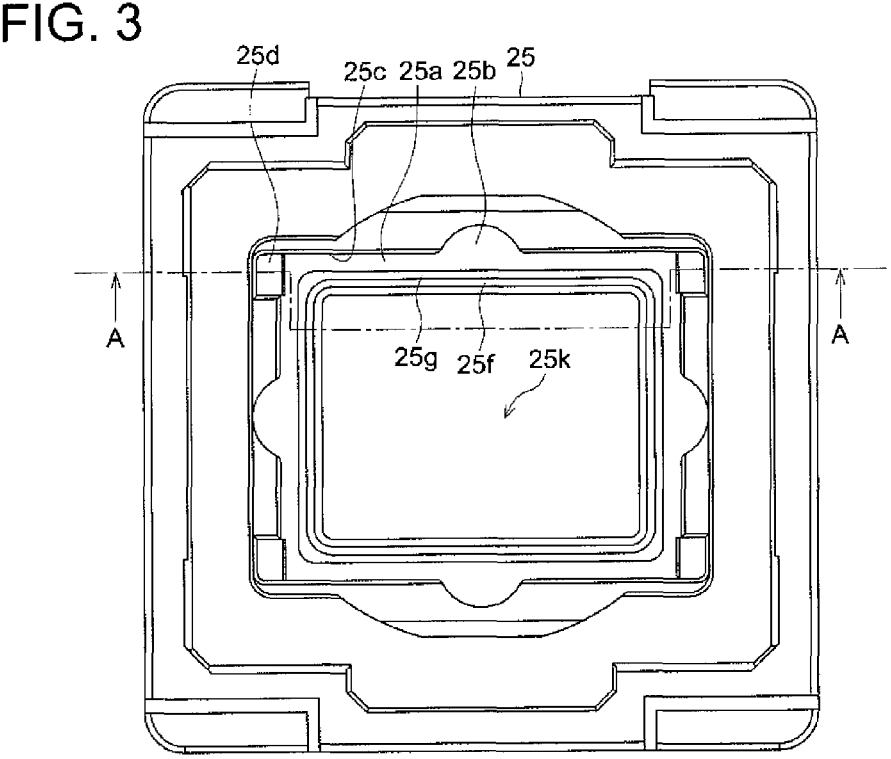
FIG. 3 is an upper view of a holding frame.
Figure 4:
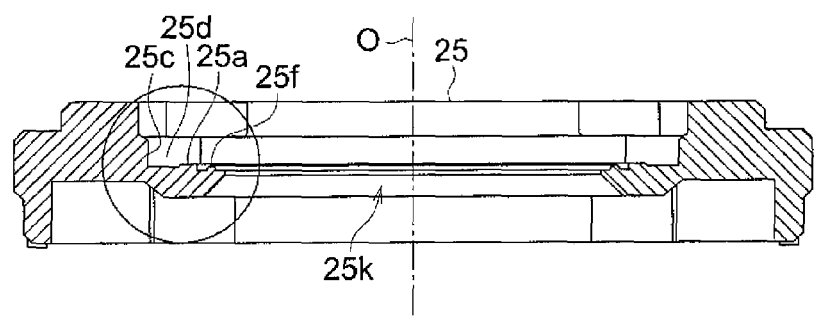
FIG. 4 is an A-A sectional view of FIG. 3.
Figure 5:
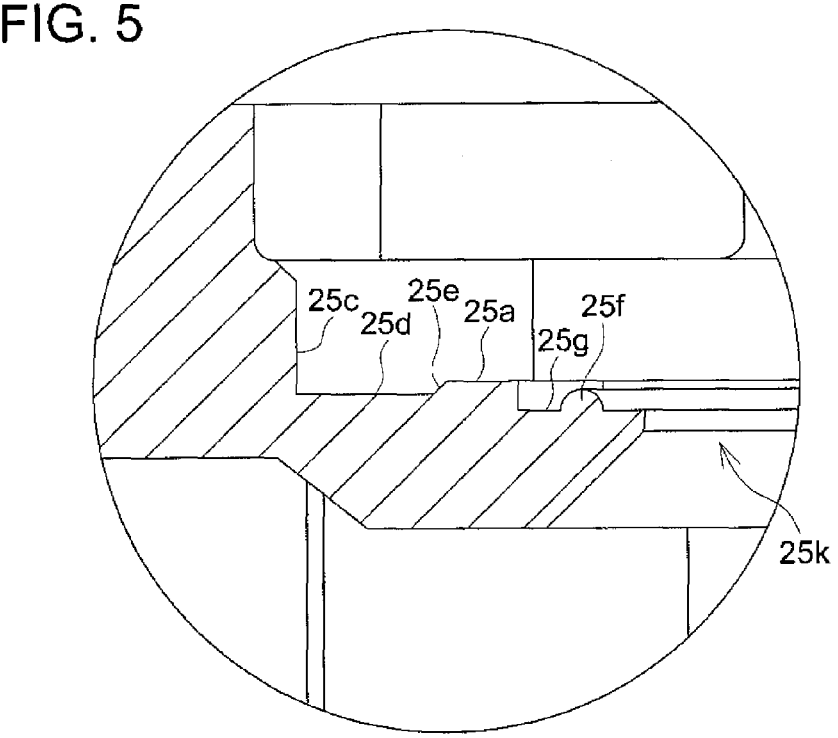
FIG. 5 is a partial enlarged sectional view of a holding frame.
Figure 6:
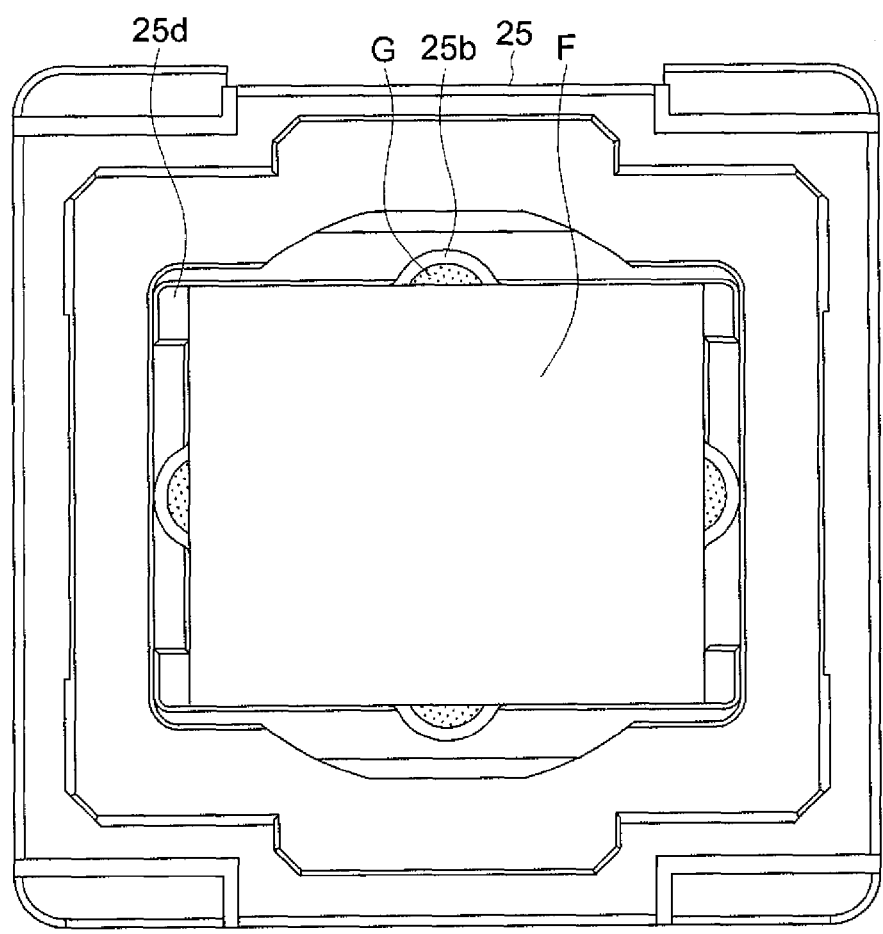
FIG. 6 is an upper view for explaining joining an infrared cut off filter to a holding frame.

Next, an example of the embodiment of the above-mentioned imaging device built in the mobile phone etc. is explained with reference to figures. FIG. 2 is a longitudinal section of an imaging device, FIG. 3 is an upper view of a holding frame, FIG. 4 is an A-A sectional view of FIG. 3, FIG. 5 is a partial enlarged sectional view of a holding frame, FIG. 6 is an upper view for explaining joining an infrared cut off filter to a holding frame.

First, the composition of the imaging device is explained with reference to FIG. 2.

An optical imaging system is constituted of the image pickup lens L which consists of plural lenses which are not illustrated, and an infrared cut off filter F which is a transparent parallel plate, sequentially from the photographic subject side, and a photographic subject light passes an optical imaging system, and images into the solid-state image pickup element 11, such as a CCD type image sensor and a CMOS type image sensor.

In addition, by the following explanation, the photographic subject side is reworded with an upper side or an upper part, the reverse side of that is reworded with a bottom side or a bottom part.

The image pickup lens L is held by an inner lens frame 21 in which the male screw 21a is formed, and this male screw 21a is screwing together with the female screw 22a formed in the outside mirror frame 22. The outside mirror frame 22 is engaged with an AF actuator 23 by means which is not illustrated, and the AF actuator 23 is fixed to the outer cylindrical case 24.

The infrared cut off filter F is formed in quadrangle, and is held on a holding frame 25 (a holding member). The holding frame 25 has an opening section 25K in which light rays from the image pickup lens L pass.

The outer cylindrical case 24 is joined to the holding frame 25 with the upper side, and first printed circuit board 12 that is a legit printed circuit board with which the solid-state image pickup element 11 etc. are mounted with the bottom side.

The first printed circuit board 12 is attached closely with a second printed circuit board 13 that is a flexible printed circuit board at its bottom surface and connected mechanically and electrically. The second printed circuit board 13 is extended in the direction perpendicular to the sheet and is connectable to an external circuit via a connector which is not illustrated.

The upper part of the outer cylindrical case 24 is stuck to a front panel 26 which has a vacancy hole for passing the light rays to the image pickup lens L.

In the above composition, since the male screw 21a and the female screw 22a are screwing together, the focus adjustment of the image pickup lens L is performed by rotating the inner lens frame 21, and moving the inner lens frame 21 relatively to an outside lens frame 22 in accordance with the optical axis O. Moreover, the auto focus actuator 23 performs focal regulation by moving the image pickup lens L with the outside lens frame 22 in accordance with the optical axis O based on the information acquired by measuring distance with a range finder means which is not illustrated.

Next, junction of the infrared cut off filter F is explained.

As shown in FIGS. 3 to 5, in order to hold the quadrangle shaped infrared cut off filter F, the holding frame 25 has a holding surface 25a which is formed in a square shape in the circumference of the opening section 25K and intersected perpendicularly to the optical axis O. An adhesive dropping surface 25b is formed circularly, wider than the width of the holding surface 25; and is respectively formed in each center of four sides of the holding surface 25a. Moreover, a side wall 25c stands in the outside to the opening section 25K of the holding surface 25a in parallel with the optical axis O. In addition, the side wall 25c is equipped on four sides of the holding surface 25a, the interval of the side wall 25c facing each other is rather larger than the outside dimension of the infrared cut off filter F.

As shown in FIG. 6, when joining the infrared cut off filter F to the holding frame 25, the infrared cut off filter F is placed on the holding surface 25a. At this time, the holding surface 25a holds the circumference part of the infrared cut off filter F.

Then, the adhesives G are dropped into the adhesive dropping surface 25b. The infrared cut off filter F and the adhesive dropping surface 25b are joined by this. In this case, the adhesives G flowed through the gap of the edge of an infrared cut off filter F and the side wall 25c by the same action as the capillarity action, and the adhesives G which flowed from two sides of the infrared cut off filter F gathers for an angle of nip.

As shown also in FIGS. 3 to 5, adhesive collecting sections 25d is formed by becoming depressed from the holding surface 25a in the four corners of the holding surface 25a. Thus, the surplus adhesive G which flowed from the two sides and gathered into four corners flows into adhesive collecting sections 25d. Therefore, the surplus adhesives G do not flow into the opening section 25K and do not drop down the solid-state image pickup element 11, after the surplus adhesives G flow through the gap of the infrared cut off filter F and the holding surface 25a.

Moreover, as shown in FIG. 4 and FIG. 5, since a wall surface 25e from the holding surface 25a to the adhesive collecting sections 25d is formed in the slanted surface, the surplus adhesives flow into the adhesive collecting sections 25d easily.

Furthermore, a surrounding surface 25g of the opening section 25K is formed by becoming depressed from the holding surface 25a. Since the adhesive G flow into adhesive collecting sections 25d first by surface tension by forming a level difference of the holding surface 25a and a bottom. of adhesive collecting sections 25d smaller than a level difference of the holding surface 25a and the surrounding surface 25g of the opening section 25K even if the adhesive G are superfluous, the adhesive G becomes difficult to flow in the direction of the opening section 25K.

In addition, a protrusion part 25f projected in a square shape is equipped in surrounding surface 25g of the opening section 25K. Even if the adhesives G gathering into four corners are superfluous, and the adhesives G overflow from adhesive collecting sections 25d, flow through the gap of the infrared cut off filter F and the side wall 25c, and flow in the direction of the opening section 25K, the adhesives G will be interrupted in the protrusion part 25f, will collect into a surface 25g between the holding surface 25a and the protrusion part 25f, and an actual is not produced.

In addition, the object joined with such adhesives G is not limited to the infrared cut off filter, may be sufficient as a cover glass of a low pass filter and a solid-state image pickup element, etc, if it is a transparent parallel plate at least in a visible light region, it will enter under the category of the present invention.

Moreover, as the adhesives G, UV hardening type, a visible light hardening type, a heat-thermosetting type, and a UV hardening type+thermosetting hardening type are suitable, and 2000 to 6000 mPa·s of viscosity is desirable.

Moreover, for example, the level difference of the holding surface 25a and the bottom of adhesive collecting sections 25d is 30 micrometers, the level difference of the holding surface 25a and the groove portion 25g is 70 micrometers, and the height of the bottom of the groove portion 25g and the protrusion part 25f is 50 micrometers.

Moreover, although four corners are right-angled quadrangles, the infrared cut off filter F shown in FIG. 6 may be the form which cut off four corners the corners depending on the case, and may be polygons other than a quadrangle.

Moreover, as shown in FIG. 6 although four corners are right-angled quadrangles, the infrared cut off filter F shown in FIG. 6 may be the form which cut off four corners the corners depending on the case, and may be polygons other than a quadrangle.

Moreover, the infrared cut off filter F shown in FIG. 6 is a quadrangle with right-angled four corners, in some case, four corners may be cut off the corners, and the infrared cut off filter F may be formed polygons other than a quadrangle.

Description of the Symbols
- 11. solid-state image pickup element
- 25. holding frame
- 25a. holding surface
- 25b. adhesive dropping surface
- 25c. side wall
- 25d. adhesive collecting sections
- 25e. wall surface
- 25f protrusion part
- 25g. groove portion
- F. infrared cut off filter
- L. image pickup lens
- O. optical axis
- G. adhesive

What is claimed is:

1. An imaging device having an optical imaging system which has a parallel plate which is transparent at least in a visible light region, is joined by adhesives and is held on a holding member, wherein the holding member comprising:

an opening section which is provided in order to pass light rays from the optical imaging system;

a holding surface for holding a periphery of the parallel plate, formed around the opening section in a square shape, and intersecting perpendicularly to an optical axis of the optical imaging system;

a side wall which is provided to stand parallel to the optical axis at an outside with respect to the opening section of the holding surface; and an adhesive collecting section which is arranged in each of four corners of the holding surface and is hollowed from the holding surface, wherein the holding member comprises an adhesive dropping surface wider than other portions in approximately each center of four sides of the holding surface.

2. The imaging device of claim 1 further comprises a solid-state image pickup element performing a photoelectric conversion of an image of a photographic subject imaged with an image pickup lens;

wherein the parallel plate is arranged between the image pickup lens and the solid-state image pickup element.

3. The imaging device of claim 1, wherein the parallel plate is an infrared cut off filter.

4. The imaging device of claim 1, wherein the parallel plate is formed in an approximate quadrangle.

5. The imaging device of claim 1 further comprises a wall surface reaching from holding surface to adhesive collecting sections is formed as a slanted surface.

6. The imaging device of claim 1, wherein a surface around the opening section is formed to be hollowed from the holding surface, and a step of the holding surface and a bottom surface of the adhesive collecting section is formed to be smaller than a step of the holding surface and the surface around the opening section.

7. The imaging device of claim 6 further comprises a protrusion part arranged in a protruding manner in a square shape at the surface around the opening section.

8. A portable terminal comprising the imaging device of claim 1.

9. An imaging device having an optical imaging system which has a parallel plate which is transparent at least in a visible light region, is joined by adhesives and is held on a holding member, wherein the holding member comprising:

an opening section which is provided in order to pass light rays from the optical imaging system;

a holding surface for holding a periphery of the parallel plate, formed around the opening section in a square shape, and intersecting perpendicularly to an optical axis of the optical imaging system;

a side wall which is provided to stand parallel to the optical axis at an outside with respect to the opening section of the holding surface;

an adhesive collecting section which is arranged in each of four corners of the holding surface and is hollowed from the holding surface; and a wall surface reaching from holding surface to adhesive collecting sections is formed as a slanted surface.

10. An imaging device having an optical imaging system which has a parallel plate which is transparent at least in a visible light region, is joined by adhesives and is held on a holding member, wherein the holding member comprising:
an opening section which is provided in order to pass light rays from the optical imaging system;
a holding surface for holding a periphery of the parallel plate, formed around the opening section in a square shape, and intersecting perpendicularly to an optical axis of the optical imaging system;
a side wall which is provided to stand parallel to the optical axis at an outside with respect to the opening section of the holding surface; and
an adhesive collecting section which is arranged in each of four corners of the holding surface and is hollowed from the holding surface,
wherein a surface around the opening section is formed to be hollowed from the holding surface, and
wherein a step of the holding surface and a bottom surface of the adhesive collecting section is formed to be smaller than a step of the holding surface and the surface around the opening section.

* * * * *